US 012541446B2

(12) United States Patent
Leung et al.

(10) Patent No.: US 12,541,446 B2
(45) Date of Patent: Feb. 3, 2026

(54) METHOD AND APPARATUS TO TRACE AND VISUALIZE DATA MOVEMENT

(71) Applicant: HUAWEI TECHNOLOGIES CO., LTD., Shenzhen (CN)

(72) Inventors: Arthur Chun-Yin Leung, Kanata (CA); Ahmed E. Hassan, Kanata (CA); Boyuan Chen, Kanata (CA); Kenneth Chong Yin Tan, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 18/417,751

(22) Filed: Jan. 19, 2024

(65) Prior Publication Data

US 2025/0238343 A1 Jul. 24, 2025

(51) Int. Cl.
G06F 11/34 (2006.01)
G06F 11/32 (2006.01)

(52) U.S. Cl.
CPC ........ *G06F 11/3466* (2013.01); *G06F 11/328* (2013.01); *G06F 11/3461* (2013.01)

(58) Field of Classification Search
None
See application file for complete search history.

(56) References Cited

U.S. PATENT DOCUMENTS

| 5,937,191 A | 8/1999 | Graham | |
| 6,751,789 B1 * | 6/2004 | Berry | G06F 11/3466 717/130 |
| 7,827,539 B1 * | 11/2010 | Wygodny | G06F 11/3409 717/130 |
| 9,983,978 B1 * | 5/2018 | Mola | G06F 11/3636 |
| 2004/0268333 A1 * | 12/2004 | Wang | G06F 9/3017 712/E9.035 |
| 2008/0016498 A1 * | 1/2008 | Underseth | G06F 11/3636 717/124 |
| 2014/0282428 A1 | 9/2014 | Andre et al. | |

OTHER PUBLICATIONS

Webpage entitled "Roofline Resources for Intel® Advisor Users", 4 pages, updated Feb. 17, 2022, retrieved from Internet: https://www.intel.com/content/www/us/en/developer/articles/technical/advisor-roofline-resources.html.
Webpage entitled "Flame Graphs", 14 pages, Dec. 2011, updated Nov. 2021, retrieved from Internet: http://www.brendangregg.com/flamegraphs.html.
N. Nethercote, "Dynamic binary analysis and instrumentation," University of Cambridge, Computer Laboratory, Technical Report No. 606, Nov. 2004.

* cited by examiner

*Primary Examiner* — Qing Chen

(57) ABSTRACT

Methods and apparatus are provided for identifying performance bottlenecks in computer programs by tracking data accesses. In embodiments of the present disclosure, trace points are inserted at accessor functions of a computer program to record accesses to data structures of the computer program. The accesses are analyzed to determine patterns of access and to prioritize data structures for refactoring. In embodiments, the analysis is visualized using a hailstone plot wherein the data structures are ranked by priority. In some embodiments, transformation strategies may be generated based on the analysis to improve the performance of the computer program.

20 Claims, 15 Drawing Sheets

METHOD AND APPARATUS TO TRACE AND VISUALIZE DATA MOVEMENT

CROSS-REFERENCE TO RELATED APPLICATIONS

This is the first application filed for the present invention.

FIELD OF THE INVENTION

The present invention pertains to computer performance and in particular to methods and apparatus for tracking computer performance.

BACKGROUND

The Von-Neumann architecture, comprising one or more processors and memory subsystems, is the model system for typical modern computing systems. In this architecture, the processors are responsible for performing arithmetic operations on given input data and outputting results of the operations, while the memory subsystems are responsible for storing data and transferring it to and from the processors. Algorithms processed by the architecture can either become compute bound or memory bound, both of which will limit the performance of the algorithm and form a processing bottleneck. When an algorithm is compute bound, its raw processing throughput is at the limit of the hardware processor pipeline. Further speedup of the algorithm can only be achieved by adding more processors or parallelizing computations. Alternatively, when an algorithm is memory bound, data cannot be delivered fast enough to the processors, which can leave them idle and underutilized. Here, further speedup, can only be achieved by compressing the data or using an additional or wider memory bus for feeding the data to the processors.

Tools have been developed to identify performance bottlenecks in computer programs. They can either be implemented statically to analyze the program's source code for antipatterns or dynamically to profile the program at runtime. Static analysis of a program does not account for the differences among the compilers or hardware configurations that can be used to execute the program. Some tools that dynamically analyze a program focus on assessing the arithmetic intensity and throughput of each program function; however, the analysis is tied to the specific computing hardware, and the recognizability of data structures from the data is challenging. Some dynamic tools report the relative execution duration of each function and functional call stack via the performance counter of a processor, which can be accessed by the operating system kernel; these tools lack representation of inefficient repeated accesses to certain classes, require special kernel permissions, and do not provide analysis pertinent to data movements. Lastly, some other dynamic tools simulate the hardware at various cache levels to report hit and miss rates of data at each source code line, but this does not represent the scope and size of data movements well. Altogether, tools available for identifying performance bottlenecks are unable to provide an understanding of performance at a data structure and software engineering level.

Therefore, there is a need for a method and apparatus for identifying performance bottlenecks in computer programs that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide methods and apparatus for identifying performance bottlenecks in computer programs.

A first aspect of the present disclosure is to provide a method to be performed by a computing device including a processor coupled to tangible, non-transitory processor-readable memory. The method may comprise receiving a computer program having a plurality of data structures each having associated thereto one or more accessor functions configured to interact with a respective data structure of the plurality of data structures. The computer program may further have a plurality of components each calling one or more of the accessor functions when the computer program is executed. The method may further comprise inserting, at each of a set of the accessor functions, a respective trace point. Each trace point may be configured to, when the respective accessor function is called, report an access of the data structure associated with the respective accessor function. The method may further comprise executing the computer program, recording, for each access reported by each trace point, a respective trace including a plurality of access metrics, analysing, for each data structure of the plurality of data structures, the plurality of access metrics of the traces corresponding to the respective data structure to obtain a respective rank indicating a priority for refactoring the respective data structure, and displaying, for each data structure of the plurality of data structures, the respective rank.

In some embodiments of the first aspect, the method may further comprise selecting one or more data structures of the plurality of data structures for refactoring in accordance with the respective rank to obtain one or more candidate data structures and refactoring the one or more candidate data structures. In some of these embodiments, the method may still further comprise compiling one or more of the plurality of components in accordance with the refactored one or more candidate data structures, and executing the computer program in accordance with the compiled one or more components. In some embodiments, the method may further comprise determining, in accordance with the plurality of access metrics of each trace, one or more patterns of data movement.

In some embodiments of the first aspect, the plurality of access metrics of each trace may identify the respective accessor function called and includes at least one of a measured latency and a return memory address.

In some embodiments of the first aspect, analysing, for each data structure of the plurality of data structures, the plurality of access metrics of the traces corresponding to the respective data structure to obtain the respective rank indicating the priority for refactoring the respective data structure may include simulating, for each data structure of the plurality of data structures, a respective cache hit rate. In some embodiments, analysing, for each data structure of the plurality of data structures, the plurality of access metrics of the traces corresponding to the respective data structure to obtain the respective rank indicating the priority for refactoring the respective data structure may include determining aggregate statistics depending from the plurality of access metrics of each trace.

In some embodiments of the first aspect, displaying, for each data structure of the plurality of data structures, the respective rank may include generating one or more hailstone plots each depicting a set of the data structures from the plurality of data structures as a corresponding set of markers indicating the respective rank. In some of these embodiments, each marker of the set of markers of each hailstone plot may further indicate, for the corresponding data structure, a respective cache hit rate, a respective count of the accesses of the respective data structure, and a respective duration of the accesses of the respective data structure. In some of these embodiments, each marker of the set of markers of each hailstone plot may have associated thereto a respective size, a respective position, and a respective color. Each marker may further indicate the respective cache hit rate, the respective count of the accesses of the respective data structure, and the respective duration of the accesses of the respective data structure through the respective size, the respective position, and the respective color. In some embodiments, each set of the data structures from the plurality of data structures corresponds to one of a plurality of types of data structures. In some of these embodiments, the plurality of types of data structures may include a map type, a vector type, and a queue type.

In some embodiments of the first aspect, each access of each data structure of the plurality of data structures may have associated thereto a respective duration of data access and a respective memory bandwidth consumption. All the durations of data access associated with the accesses of each data structure may define a respective total duration of data access for the respective data structure, and all the memory bandwidth consumptions associated with the accesses of each data structure may define a respective total memory bandwidth consumption for the respective data structure. In these embodiments, the respective rank of each data structure of the plurality of data structures may depend from a weighted sum of the respective total duration of data access and the respective total memory bandwidth consumption.

In some embodiments of the first aspect, at least one data structure may be a class-based object. In some embodiments, at least one data structure may be a container having a plurality of data elements. In some embodiments, each data structure of the plurality of data structures may belong to a data structure library.

In some embodiments of the first aspect, the method may further comprise determining, in accordance with the respective rank of each data structure of the plurality of data structures, one or more transformation strategies each identifying one or more groups of data structures from the plurality of data structures. Each transformation strategy may further identify, for each of the respective one or more groups of data structures, a respective one or more refactoring transformations. In these embodiments, the method may still further comprise selecting a target transformation strategy from the one or more transformation strategies, refactoring each of the one or more groups of data structures of the target transformation strategy in accordance with the respective one or more refactoring transformations, compiling one or more of the plurality of components in accordance with the refactored one or more groups of data structures, and executing the computer program in accordance with the compiled one or more components. In some of these embodiments, each of the respective one or more refactoring transformations of each transformation strategy may be a respective cache replacement algorithm. In some embodiments, each cache replacement algorithm may be one of: a first-in-first-out algorithm, a last-in-first-out algorithm, a least-recently-used algorithm, a least-frequently-used algorithm, a least-frequently-recently-used algorithm, and a clock algorithm.

A second aspect of the present disclosure is to provide a computing device comprising a processor coupled to tangible, non-transitory processor-readable memory. The memory may have stored thereon instructions to be executed by the processor to implement the method of the first aspect and any variations thereof.

A third aspect of the present disclosure is to provide a non-transitory processor-readable memory having stored thereon instructions to be executed by a processor to implement the method of the first aspect and any variations thereof.

Embodiments have been described above in conjunction with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present disclosure are generally directed towards identifying performance bottlenecks in computer programs by inserting trace points that record accesses to data structures of the computer program. The trace points may be inserted at accessor functions of the computer program. Accesses of each data structure may be analyzed with statistical or simulation techniques to determine a priority ranking for refactoring the respective data structure. In some embodiments, the rankings of each data structure and other analysis may be displayed using a hailstone plot. In some embodiments, one or more transformation strategies for refactoring data structures may be generated in accordance with the rankings of each data structure. In some of these embodiments, one of the transformation strategies may be selected and applied to the computer program.

The present disclosure sets forth various embodiments via the use of block diagrams, flowcharts, and examples. Insofar as such block diagrams, flowcharts, and examples contain one or more functions and/or operations, it will be understood by a person skilled in the art that each function and/or operation within such block diagrams, flowcharts, and examples can be implemented, individually or collectively, by a wide range of hardware, software, firmware, or combination thereof. As used herein, the term "about" should be read as including variation from the nominal value, for example, a +/−10% variation from the nominal value. It is to be understood that such a variation is always included in a given value provided herein, whether or not it is specifically referred to. The terms in each of the following sets may be used interchangeably throughout the disclosure: "application" and "computer program"; and "hailstone" plot and "GRELE" plot.

Figure 1:
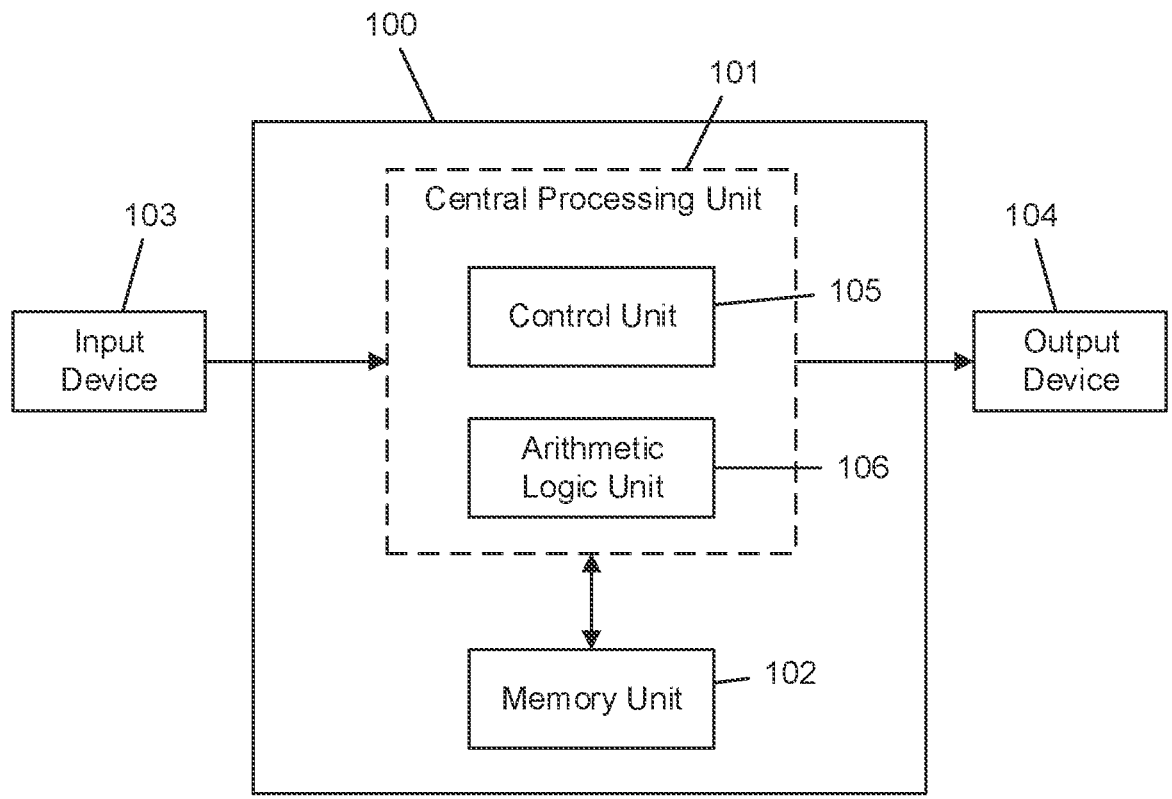
FIG. 1 shows a computing system typical of the prior art where embodiments of the present disclosure may be implemented.

FIG. 1 shows a schematic of a computing system 100 typical of the prior art, where embodiments of the present disclosure may be implemented. The computing system 100 comprises one or more processors 101, such as a central processing unit (CPU), and one or more memory units 102. The computing system is configured to receive input data from an input device 103 and produce output to be sent to an output device 104. Each processor 101 is configured to perform arithmetic operations on input data and to produce output. Each memory unit 102 is configured to store and transfer data for operations at the processor 101. Each processor 101 may include a control unit 105 and an arithmetic logic unit 106. Computations performed by the computing system 100 can encounter two bottleneck possibilities: becoming compute bound, where the processors 101 limit throughput, or becoming memory bound, where the memory units 102 cannot transfer data to the processors 101 fast enough.

Embodiments of the present disclosure may provide methods and apparatus for detecting bottlenecks and generating strategies for optimizing computer programs in view of the bottlenecks.

Figure 2:
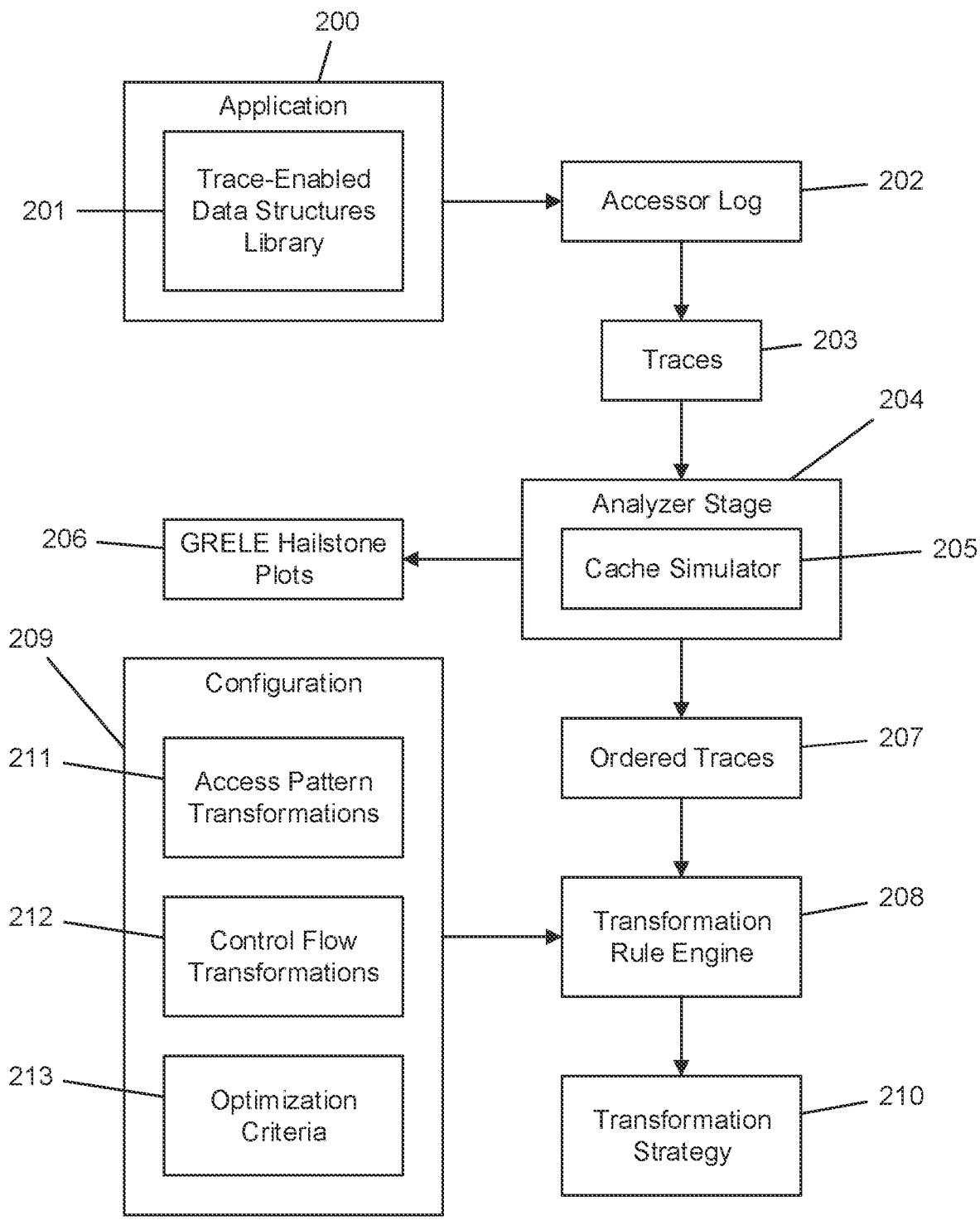
FIG. 2 shows a schematic for tracking data accesses of a computer program, in accordance with embodiments of the present disclosure.

FIG. 2 shows a schematic for tracking data accesses by an application 200 on a computing system 100 according to embodiments of the present disclosure. The application 200 (i.e., a "computer program") may have a plurality of data structures that each have associated thereto one or more accessor functions. The data structures may, for example, be class-based objects of an object-oriented programming language or a container of multiple data elements such as arrays, vectors, maps, queues, and lists. The data structures may further belong to a data structure library 201. Each accessor function may be configured to interact with the respective data structure, such as by reading or writing data in memory or copying data from one memory unit to another. Examples of accessor functions may include emplace, begin, end, find, and operator functions. The application 200 may further have a plurality of components that each call one or more of the accessor functions when the application 200 is executed.

A trace point may be inserted at each of the accessor functions associated with the data structures of the data structure library. These trace points may be configured to report an access of the data structure associated with the respective accessor function when that accessor function is called during execution of the application 200. Each access reported by a trace point may be recorded in an accessor log 202 as a trace 203. Each access may have associated with it a respective duration of the data access and a respective memory bandwidth consumption. Each trace 203 may include a plurality of access metrics, such as a uniquely identifying instance number (ID), the respective accessor type, a measure of latency, and a return memory address. The measure of latency may be a time needed to complete the respective interaction with the data structure, and the return address may be a location from which the application reads the data structure. The accessor log 202 may be stored on the computing system 100.

At an analyzer stage 204, the traces 203 may be analyzed for patterns of access to the data structures of the application 200. This may include computing aggregate statistics for each data structure. It may further, or alternatively, include computing the hit rates of cache replacement algorithms using a cache simulator 205. The cache hit rate may indicate a likelihood for re-accessing the respective data structure, or in other words, a likelihood for efficiency improvements for accessing the data structure if the data structure were to be cached. Additional simulator models may be used at the analyzer stage 204 to generate corresponding metadata. The results of the analysis at the analyzer stage 204 may include patterns of data movement and a rank for each data structure indicating a priority for refactoring the respective data structure to optimize the application 200. The rank for each data structure may depend from a weighted sum of a respective total duration of data accesses and a respective total memory bandwidth consumption.

The results of the analyzer stage 204 may be used to generate one or more hailstone plots (i.e., "GRELE" plots) 206. Each hailstone plot 206 may display, for each data structure, features respective to that data structure, such as the respective rank, respective total duration of data accesses, a respective count of the accesses, and a respective cache hit rate. These features may be displayed using a respective marker for each data structure that displays the features through its size, position, shading, and color. Each marker may display features through other attributes. A separate hailstone plot 206 may be generated for each type of data structure.

The traces 203 and their rankings may be used to order 207 the traces 203, which may be provided as input to a transformation rule engine 208. The transformation rule engine 208 may be configured to receive as input a configuration 209 of the computing system 100 and the ordered traces 207 to produce one or more transformation strategies 210. The configuration 209 may include access pattern transformations 211, control flow transformations 212, and optimization criteria 213. The transformation rule engine 208 may be configured as a constraint solver and may use the inputs of the configuration 209 to search for an optimal combination of transformations for a transformation strategy 210. Individual transformations may have constraints and become incompatible with each other. The transformation rule engine 208 may consider these constraints holistically. Tables 1 and 2 show an example of generating transformation strategies 210 with the transformation rule engine 208. In the example, the optimization criteria 213 for each transformation is either memory usage (M) or runtime (R), runtime is minimized for the entire application 200, there is a memory budget of 8.2, and the application 400 has four data structures. Three access pattern transformations (211*a*, 211*b*, 211*c*) and two control flow transformations (212*a*, 212*b*) are available for the transformation strategy 210. Access pattern transformation 211*a* is optimal for decreasing runtime (−40%) but is incompatible with control flow transformation 212*b*. If the access pattern transformation 211*a* were to be applied to every data structure (strategy 1), the application 200 would exceed the memory budget and would therefore not be viable. A better strategy (strategy 2) may be to apply access pattern transformation 211*a* situationally and to combine control flow transformation 212*b* with access pattern transformation 211*a* for some data structures. The transformation rule engine 208 may be configured to ensure each transformation strategy 210, when applied throughout the application 200, collectively does not exceed the set constraints in configuration 209 but still achieves the optimization criteria 213.

TABLE 1

Examples of changes to memory usage and runtime for transformations.

| | Transformation | Memory Usage | Runtime |
|---|---|---|---|
| Access Pattern Transformations | 211a | +40% | −40% |
| | 211b | +20% | −20% |
| | 211c | +10% | −10% |
| Control Flow Transformations | 212a | −10% | +10% |
| | 212b | +10% | −10% |

TABLE 2

Examples of memory usage and runtime for transformation strategies.

| | Initial Application | | | Strategy 1 | | | Strategy 2 | | |
|---|---|---|---|---|---|---|---|---|---|
| Data Structure | Transform | M | R | Transform | M | R | Transform | M | R |
| 1 | — | 1 | 1 | 211a | 1.4 | 0.6 | 211a | 1.4 | 0.6 |
| 2 | — | 1 | 1 | 211a | 1.4 | 0.6 | 211b & 212b | 1.3 | 0.7 |
| 3 | — | 2 | 2 | 211a | 2.8 | 1.2 | 211a | 2.8 | 1.2 |
| 4 | — | 2 | 2 | 211a | 2.8 | 1.2 | 211b & 212b | 2.6 | 1.4 |
| Total | | 6 | 6 | | 8.4 | 3.6 | | 8.1 | 3.9 |

Figure 3:
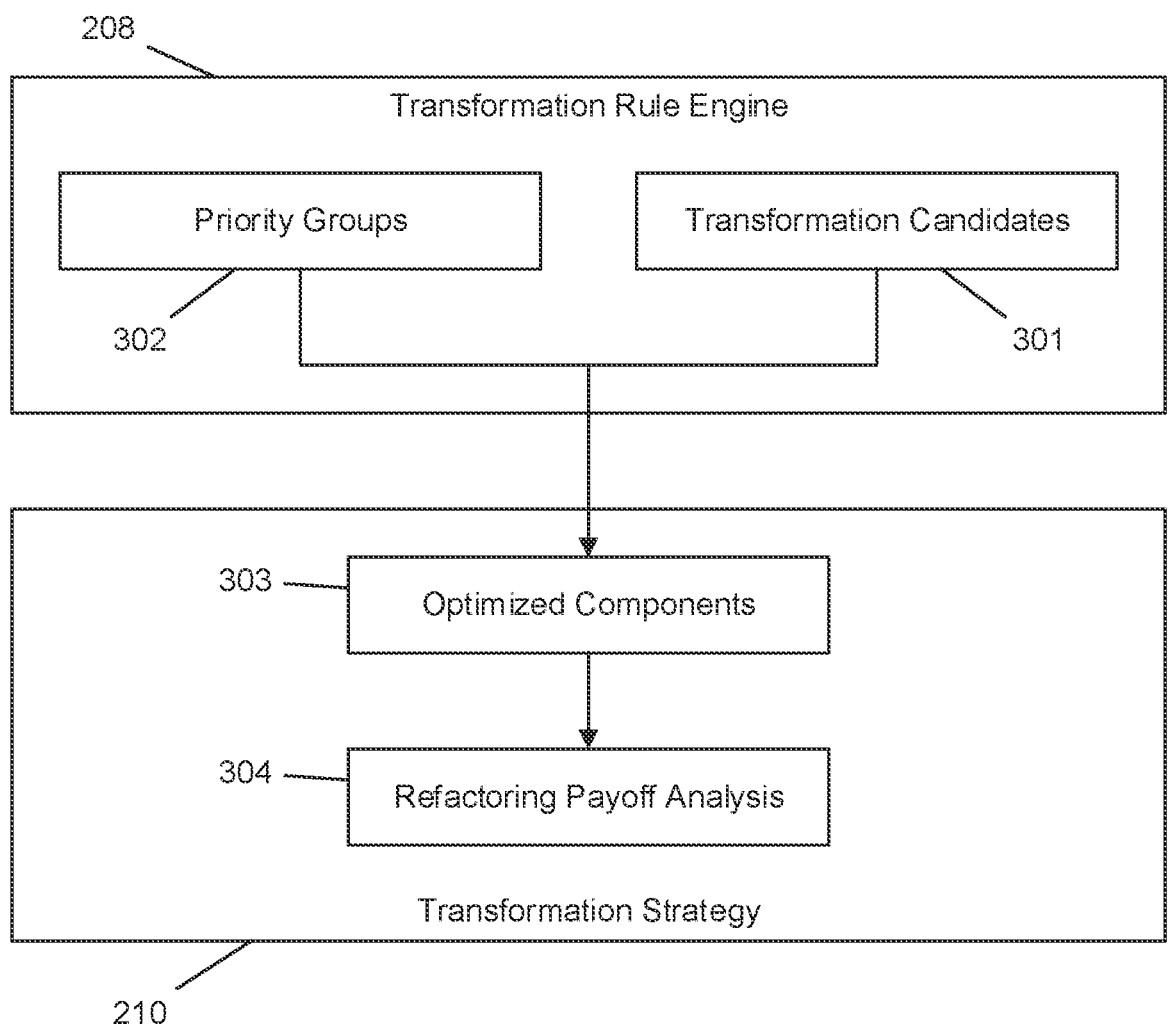
FIG. 3 shows a schematic for a transformation rule engine and for producing transformation strategies, in accordance with embodiments of the present disclosure.

FIG. 3 shows a schematic for a transformation rule engine 208 producing transformation strategies 210 according to embodiments of the present disclosure. The transformation rule engine 208 may use the ordered traces 207 and one or more transformation algorithms 301 to produce the transformation strategies 210. The transformation algorithms 301 may be pre-determined candidates for transformations. The transformation algorithms 301 may include, for example, cache replacement algorithms such as a first-in-first-out (FIFO) algorithm, a last-in-first-out (LIFO) algorithm, a least-recently-used (LRU) algorithm, a least-frequently-used (LFU) algorithm, a least-frequently-recently-used (LFRU) algorithm, and a clock algorithm. The transformation rule engine 208 may be configured to identify one or more priority groups 302 of traces from the ordered traces 207, such as a high-priority group and a low-priority group. The transformation rule engine 208 may further be configured to select one or more transformation algorithms 301 (i.e., "refactoring transformations") for each priority group 302.

Each transformation strategy 210 may comprise one or more optimized components 303 of the application 200. Each optimized component 303 may be generated in accordance with the one or more transformation algorithms 301 selected for each priority group 302 by the transformation rule engine 208 by applying the one or more transformation algorithms 301 to the data structures of the priority groups 302. In other words, the optimized components 303 may be generated by refactoring the data structures. Each transformation strategy 210 may have associated with it a refactoring payoff 304 that may be determined by compiling the application 200 with the optimized components 303 of the respective transformation strategy 210, executing the application 200, measuring one or more performance metrics of the application 200, and analysing the metrics for the refactoring payoff 304. Performance metrics may include, for example, percent runtime and throughput improvement. Analysing the metrics may include performing simulations in accordance with the performance metrics.

Figure 4:
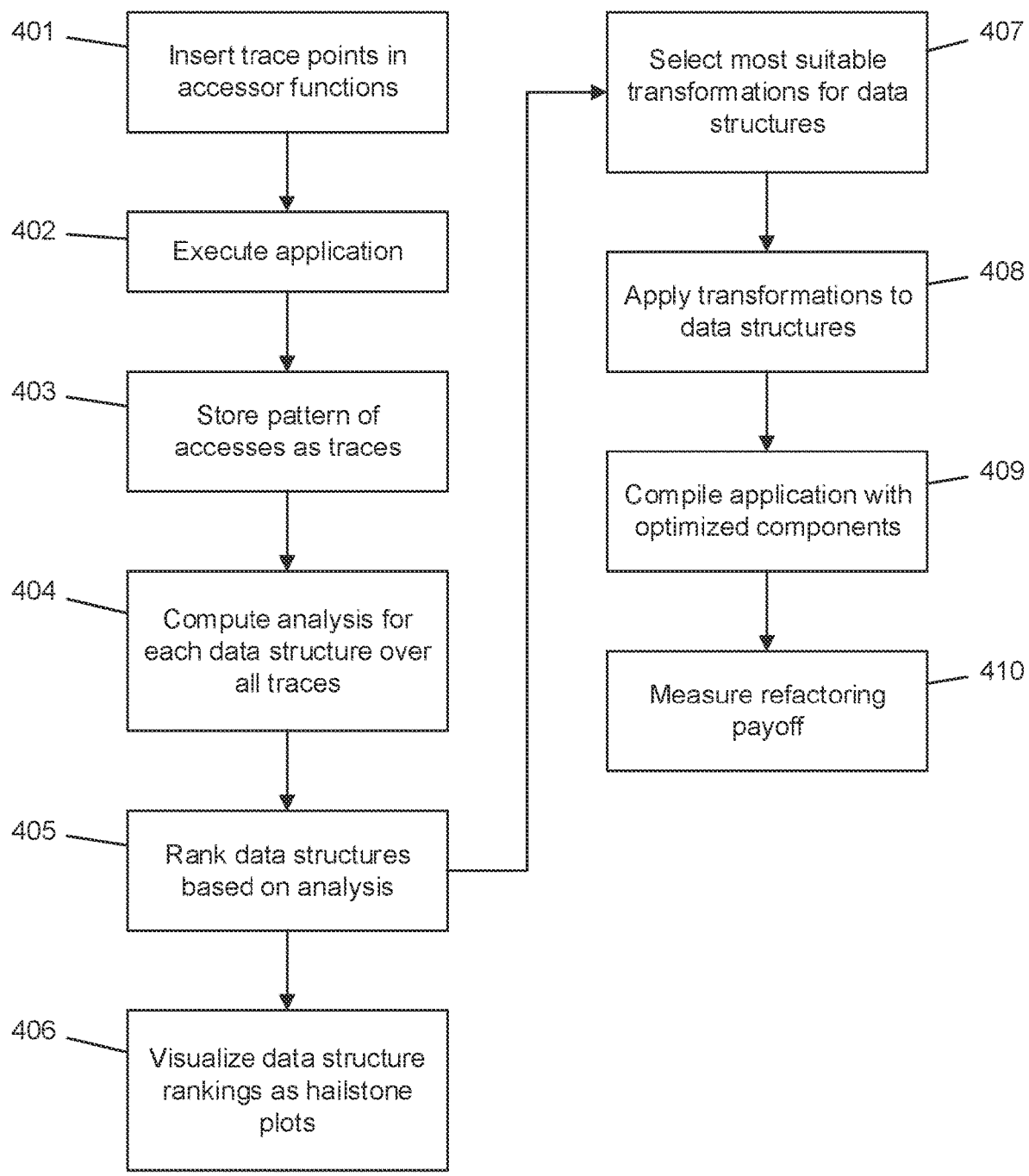
FIG. 4 shows a flowchart of a method for tracking data accesses of a computer program and for producing transformation strategies, in accordance with embodiments of the present disclosure.

FIG. 4 shows a flowchart of a method for tracking data accesses by an application 200 and for producing transformation strategies in accordance with an embodiment of the present disclosure. The flowchart of FIG. 4 defines actions that may be performed with the structures and processes discussed in relation to FIGS. 2 and 3. At action 401, trace points may be inserted into the application 200 at one or more of its accessor functions. At action 402, the application may be executed. When the data structures are accessed by the accessor functions, each access may be recorded as a respective trace 203 and stored in an accessor log 202, at action 403. At action 404, analysis may be computed for each data structure over all the traces. At action 405, the data structures may be ranked for priority for refactoring in accordance with the analysis computed at action 404. At action 406, the rankings for each data structure and/or other analysis may be visualized (or "displayed") using one or more hailstone plots. At action 407, transformation strategies 210 may be generated by selecting one or more transformation algorithms 301 for groups 302 of data structures selected based on their rankings. At action 408, the transformation strategies 210 may be implemented by applying the respective transformation algorithms 301 to the respective priority groups 302 (i.e., "refactoring" the data structures of the respective priority groups) to generate optimized components 303. At action 409, the application 200 may be compiled with the optimized components 303. At action 410, the application 200 may be executed again and a respective refactoring payoff 304 may be measured for each transformation strategy 210.

Figure 5:
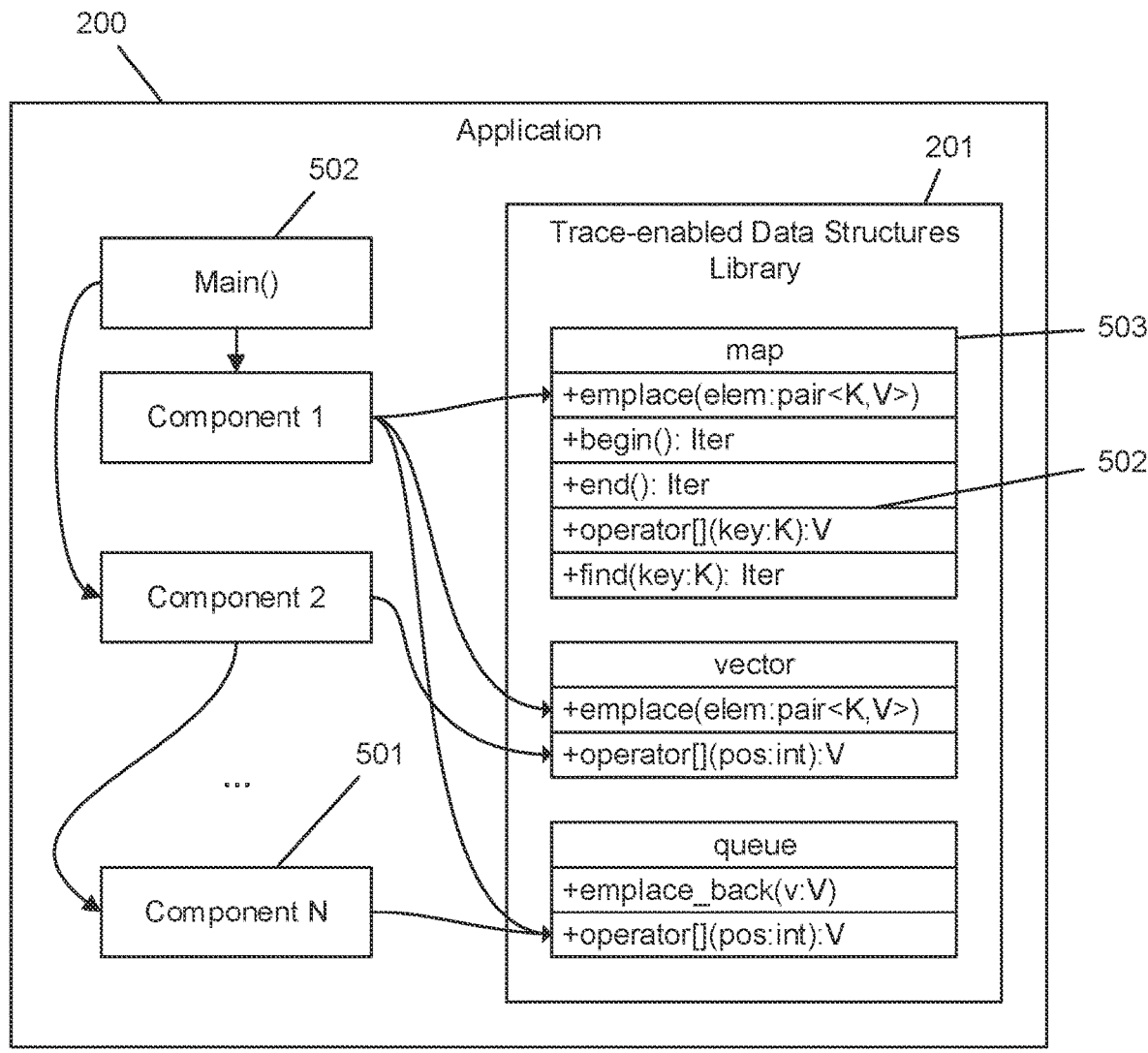
FIG. 5 shows an example of a computer program for which embodiments of the present disclosure may be implemented.

FIG. 5 shows an example of an application 200 for which embodiments of the present disclosure may be implemented. The application 200 comprises N components 501 and includes a main function 502 ("main( )"). Each component 501 calls one or more accessor functions 502 that interacts with a data structure of a respective data structure type 503. Examples of accessor functions 502 are shown in FIG. 5 as emplace, begin, end, operator, and find functions. Examples of data structure types 503 are shown in FIG. 5 as maps, vectors, and queues. The data structure types 503 and their respective accessor functions 502 may belong to a data structure library 201, which may contain trace points inserted therein as described in relation to action 401.

Figure 6:
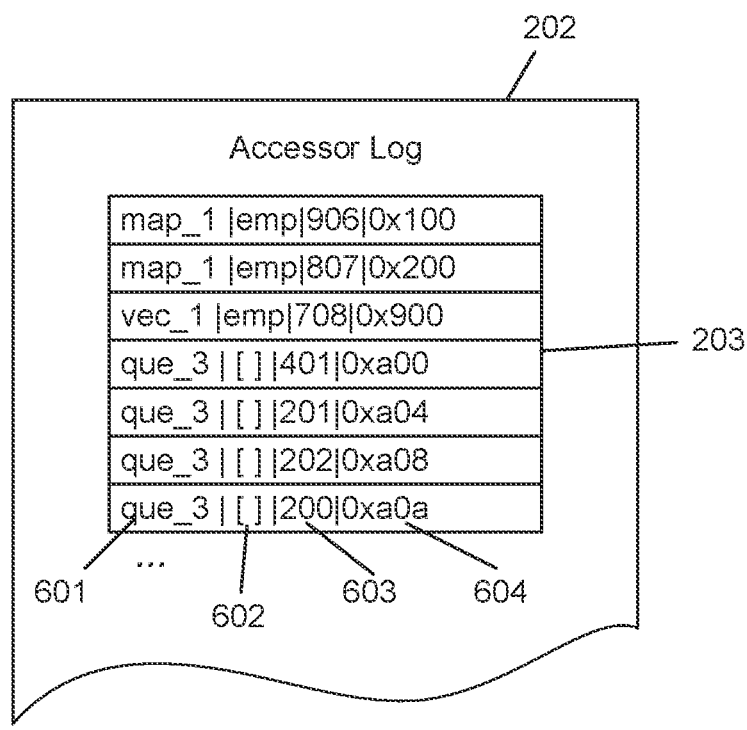
FIG. 6 shows an example of an accessor log in accordance with an embodiment of the present disclosure.

FIG. 6 shows an example of an accessor log 202, in accordance with an embodiment of the present disclosure. The accessor log 202 is shown identifying a plurality of traces 203, each including a plurality of access metrics. Each trace 203 is shown with the following access metrics: an instance identifier 601, an accessor type identifier 602, a latency measure 603, and a return memory address 604. The ordering of the traces 203 in the accessor log 202 indicates the order of accesses.

Figure 7A:
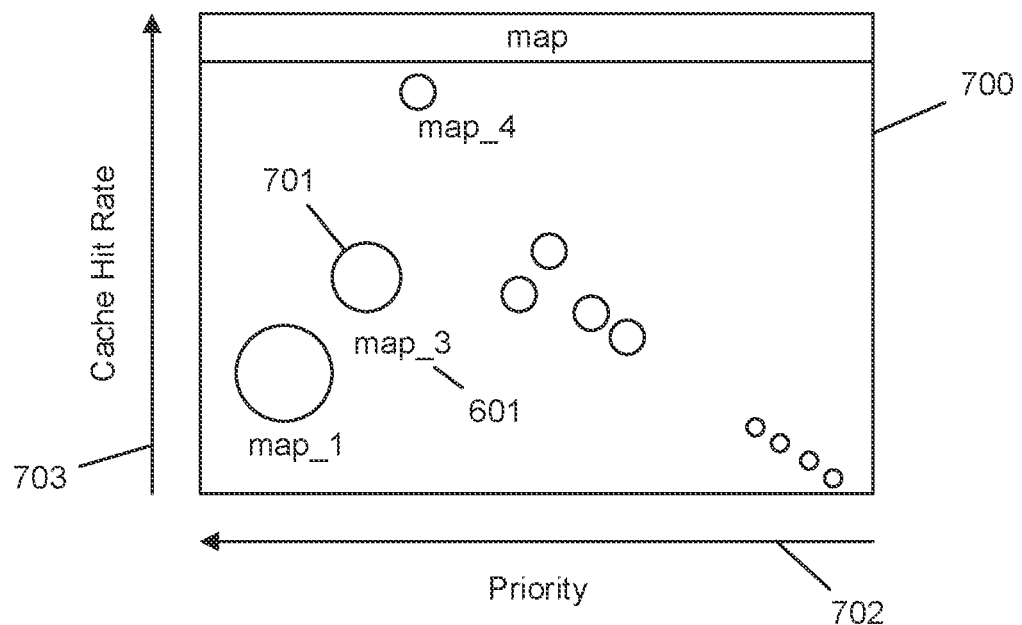
FIG. 7A shows an example of a hailstone plot for map data structures, in accordance with an embodiment of the present disclosure.
Figure 7B:
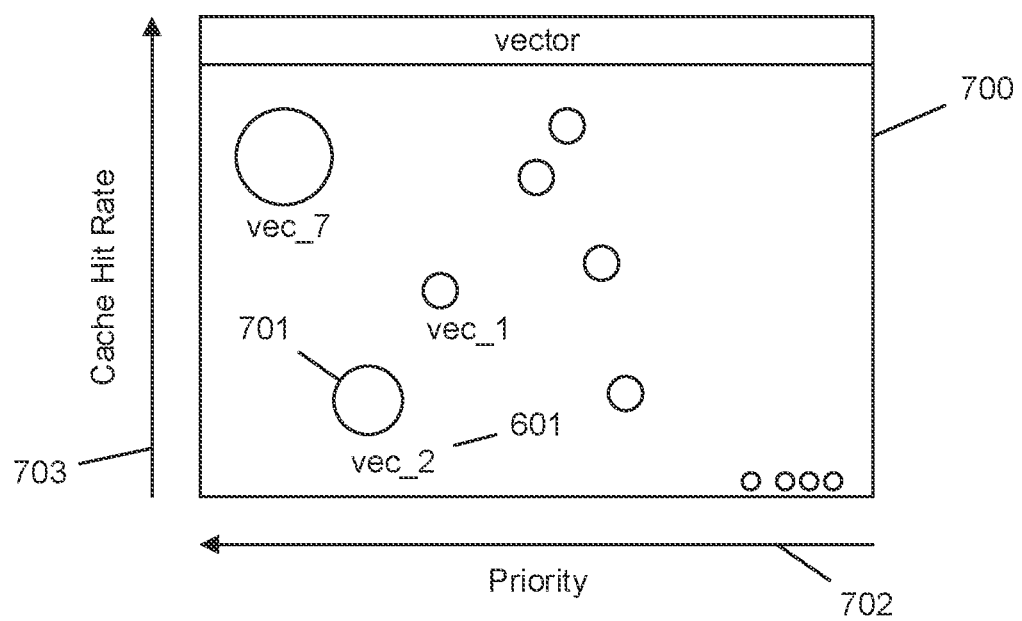
FIG. 7B shows an example of a hailstone plot for vector data structures, in accordance with an embodiment of the present disclosure.
Figure 7C:
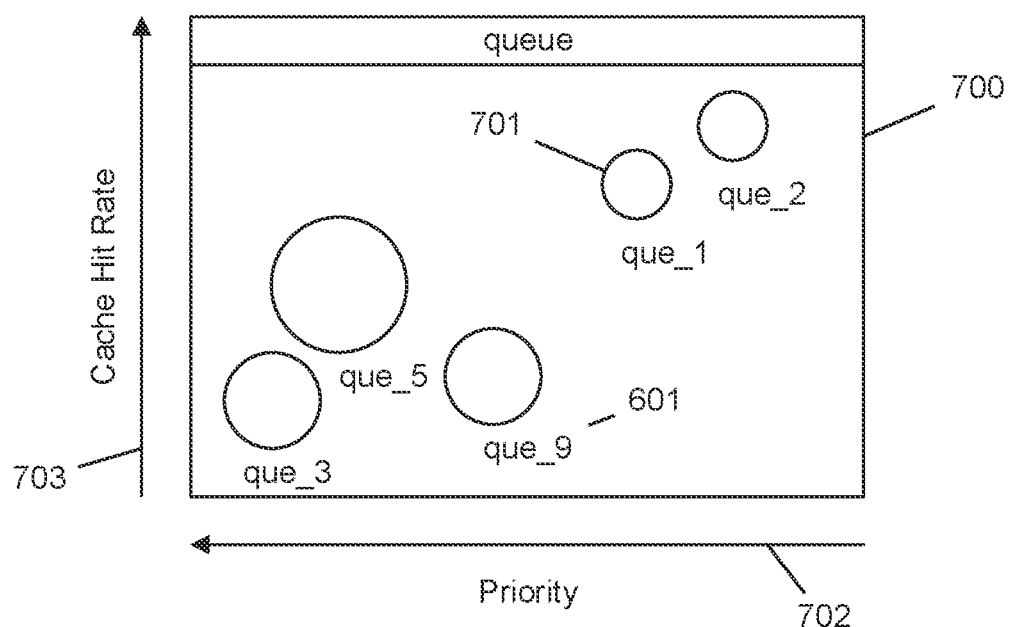
FIG. 7C shows an example of a hailstone plot for queue data structures, in accordance with an embodiment of the present disclosure.

FIGS. 7A, 7B, and 7C show examples of hailstone plots 700 generated in accordance with embodiments of the present disclosure for an application 200. FIG. 7A shows an example of a hailstone plot 700 for data structures of a map type. FIG. 7B shows an example of a hailstone plot 700 for data structures of a vector type. FIG. The hailstone plot 700 shows an example of a hailstone plot 700 for data structures of a queue type. Each hailstone plot 700 shows a plurality of markers 701 each corresponding to a data structure of the application 200. Each marker 701 has a respective position in the respective hailstone plot 700 that indicates a priority ranking 702 and cache hit rate 703 for that marker 701. Each marker 701 further has a respective size that indicates a respective total duration of data accesses. One or more markers 701 of each hailstone plot 700 may be labelled by the respective instance identifier 601.

Figure 8:
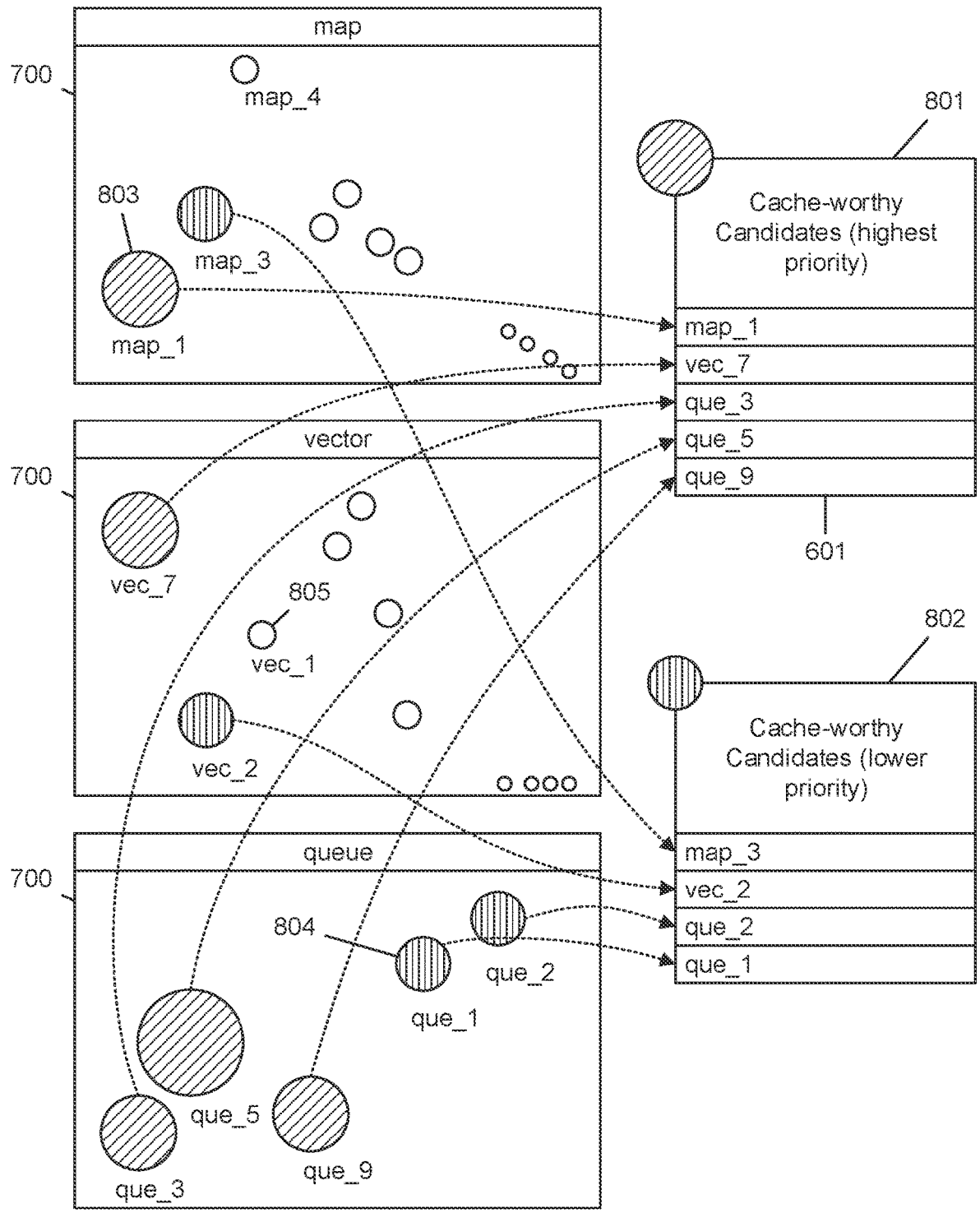
FIG. 8 shows an example of priority group selection for producing transformation strategies, in accordance with an embodiment of the present disclosure.

FIG. 8 shows an example of selecting data structures to form priority groups 302 for transformation strategies 210, in accordance with an embodiment of the present disclosure. In accordance with the priority rankings and other analysis of each data structure, data structures are categorized into priority groups 302. In FIG. 8, two priority groups 302 are shown: a highest priority group 801 and a lower-priority group 802. The data structures for these priority groups are considered to be cache-worthy candidates (high-priority candidates 803 and lower-priority candidates 804). The grouping of data structures is shown by shading applied to the markers 701 of hailstone plots 700 for map, vector, and queue data structure types. In some other embodiments, the grouping may be indicated by another suitable feature such as color. The data structures belonging to each priority group 302 are indicated by the respective instance identifier 601. Some data structures may not be selected for any priority group 302 (non-candidates 805).

Figure 9A:
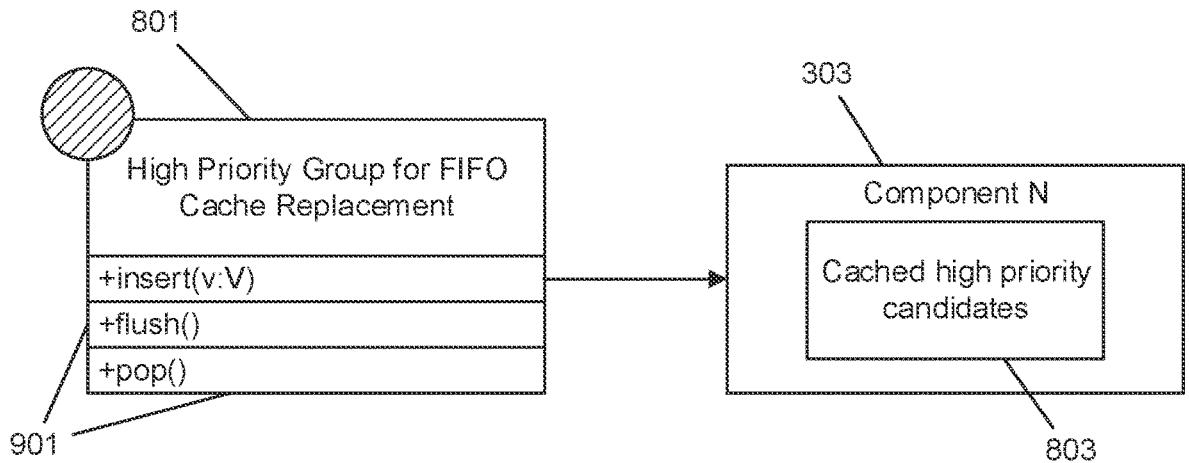
FIG. 9A shows a first example of producing optimized application components in accordance with an embodiment of the present disclosure.
Figure 9B:
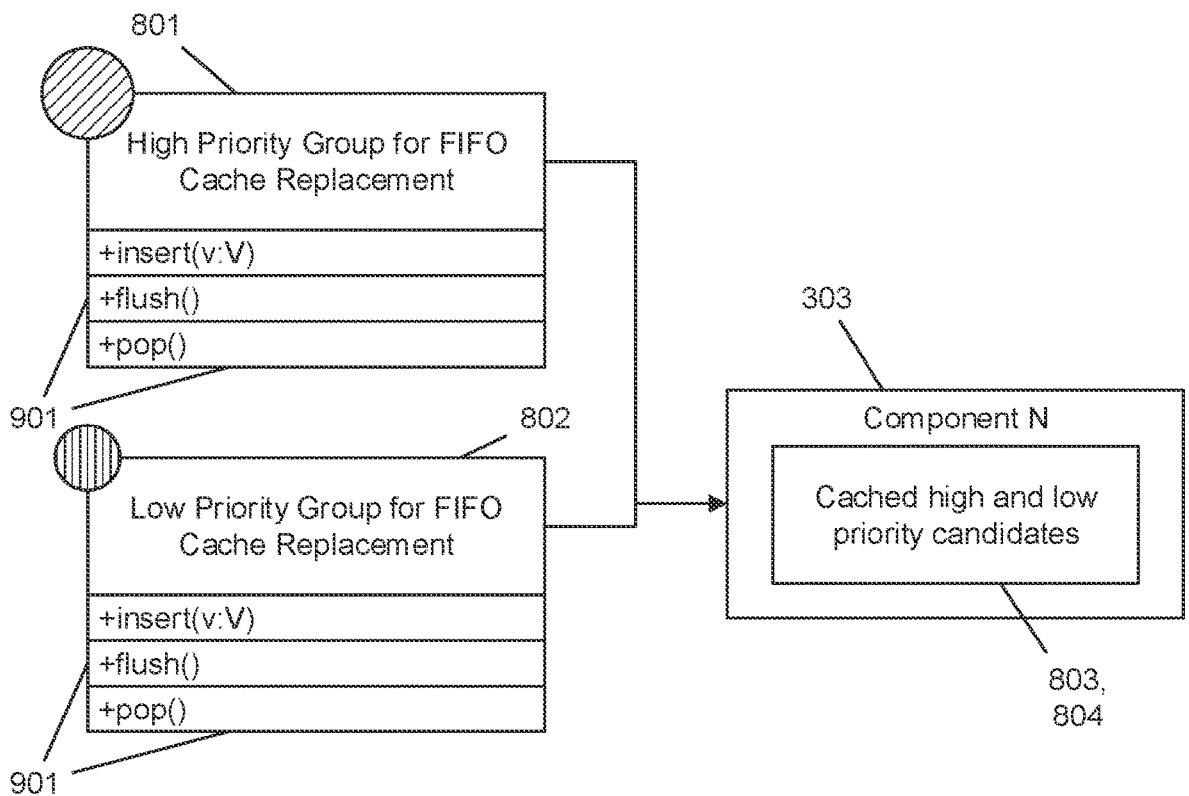
FIG. 9B shows a second example of producing optimized application components in accordance with an embodiment of the present disclosure.

FIG. 9A shows an example of producing optimized components 303 by a transformation strategy 210 in accordance with an embodiment of the present disclosure. A highest-priority group 801, as discussed in relation to FIG. 8, is selected for refactoring by a FIFO cache replacement algorithm. The FIFO cache replacement algorithm includes member functions 901, which are used to control cache. Examples of member functions 901 are shown in FIG. 9A as +insert(v:V), +flush( ), and +pop( ). Once the transformation algorithm 301 is applied to the data structures of the highest-priority group 801, an optimized component 303 is produced wherein the high-priority candidates 803 have been cached. FIG. 9B shows another example of producing optimized components 303 by a transformation strategy 210 in accordance with an embodiment of the present disclosure. In contrast with FIG. 9A, a highest-priority group 801 and a lower-priority group 802, as discussed in relation to FIG. 8, are selected for refactoring by a FIFO cache replacement algorithm in FIG. 9B. Once the transformation algorithm 301 is applied to the data structures of the highest-priority group 801 and the lower-priority group 802, an optimized component 303 is produced wherein the high-priority candidates 803 and the lower-priority candidates 804 have been cached.

Figure 10:
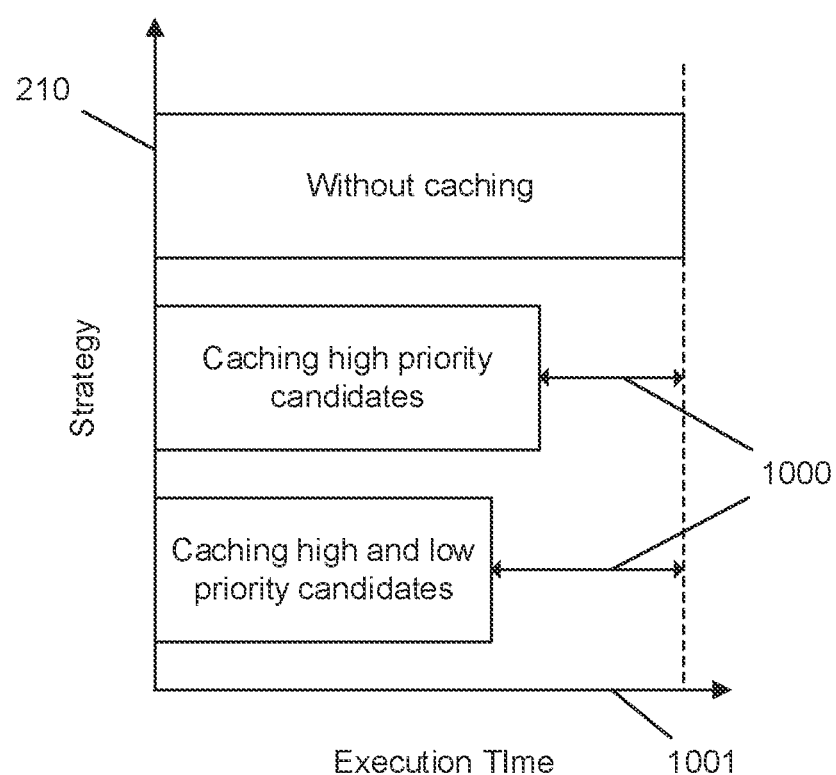
FIG. 10 shows an example of refactoring payoff analysis in accordance with an embodiment of the present disclosure.

FIG. 10 shows an example of refactoring payoff analysis 304 for two transformation strategies 210 for an application 200, in accordance with an embodiment of the present disclosure. A refactoring payoff 1000 for each transformation strategy 210 is shown as an improvement in the execution time 1001 for the application 200. The two transformation strategies 210 shown in FIG. 10 correspond to those discussed in relation to FIGS. 9A and 9B, wherein, respectively, only the highest-priority group 801 and both the highest-priority group 801 and the lower-priority group 802 have been refactored. The latter transformation strategy 210 has a greater refactoring payoff 1000 than the former but may incur greater implementation costs.

Figure 11A:
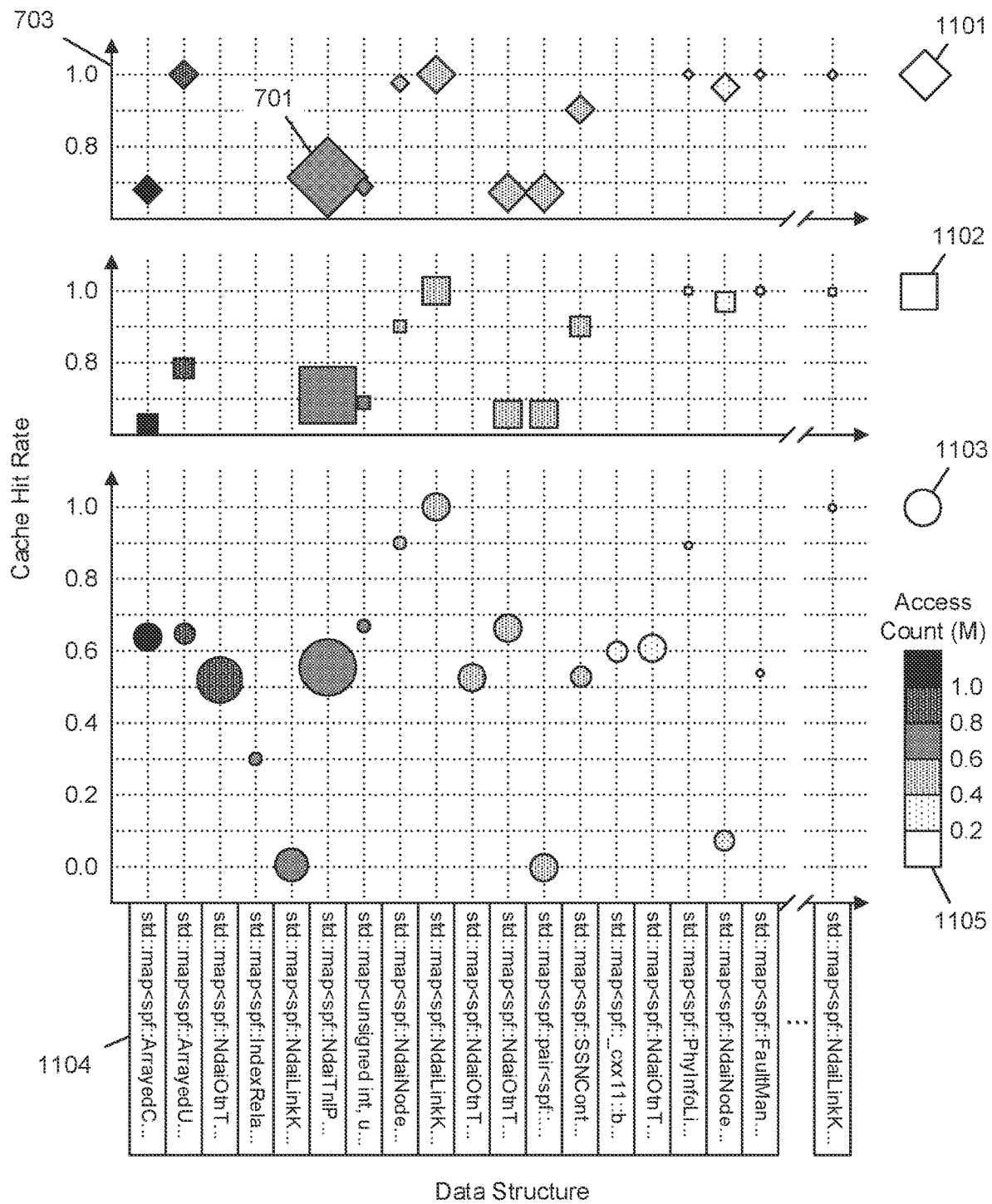
FIG. 11A shows an example of a hailstone plot displaying refactoring payoffs for various transformation strategies, in accordance with an embodiment of the present disclosure.

FIG. 11A shows an example of a hailstone plot 700 displaying refactoring payoffs for three transformation strategies 210, in accordance with an embodiment of the present disclosure. The hailstone plot 700 of FIG. 11 shows the cache hit rate 703 for all accesses to each data structure wherein either the last one (1101, circles), two (1102, squares), or three (1103, rhombuses) objects have been cached according to a FIFO cache replacement algorithm. Each data structure is identified by a data structure identifier 1104 and its cache hit rate 703 is indicated by the position of a respective marker 701. Each marker 701 has a respective size indicating a respective total duration of memory access and has a respective shading indicating a respective access count 1105. The hailstone plot 700 of FIG. 11A shows that increasing the number of objects cached by the FIFO cache replacement algorithm increases the cache hit rate 703; however, the increases diminish with each additional object cached. The increases in cache hit rate 703 for a data structure may indicate improvements in efficiency for accessing that data structure. A larger size of a marker 701 may indicate that more time is spent accessing the respective data structure during execution of the application 200 and therefore refactoring may have a greater payoff. Similarly, a darker shading of a marker 701 may indicate that the respective data structure is accessed more frequently during execution and therefore refactoring may have a greater payoff. In some other embodiments, color may be used to indicate access count 1105 instead of shading.

Figure 11B:
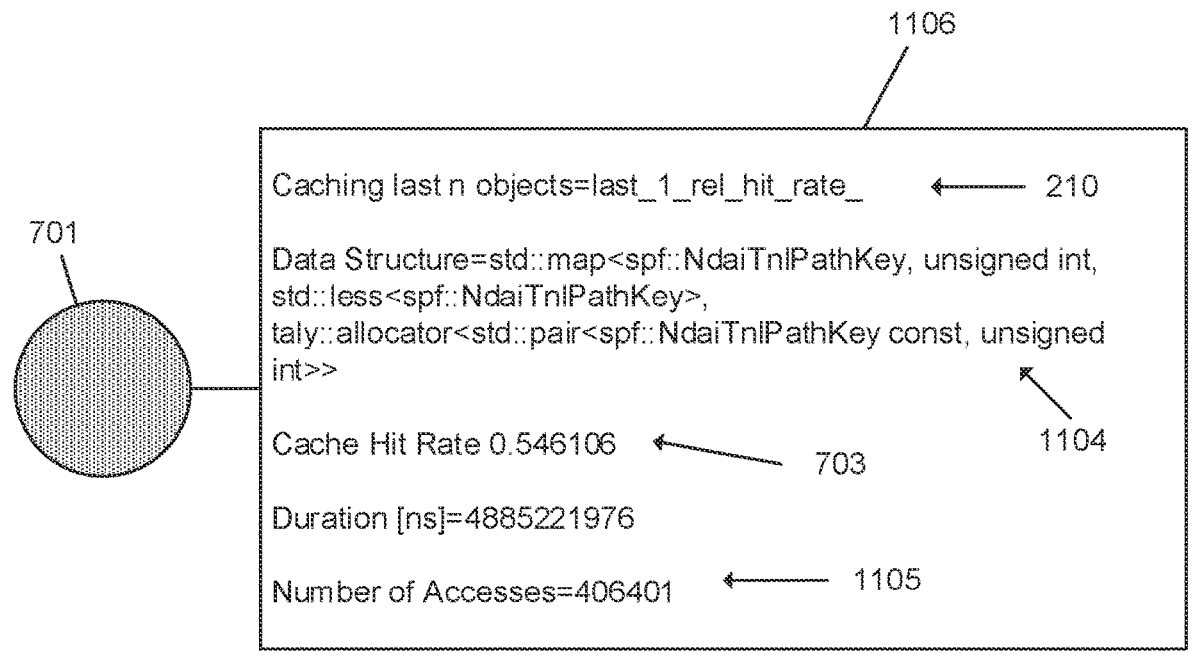
FIG. 11B shows an example of a marker with associated analysis for a hailstone plot, in accordance with an embodiment of the present disclosure.

FIG. 11B shows an example of a marker 701 for a data structure of a hailstone plot 700 and further shows analysis 1106 associated with the marker 701, in accordance with an embodiment of the present disclosure. The analysis 1106 may correspond to results produced from an analyzer stage 204. In FIG. 11B, the analysis 1106 includes information on transformation strategies 210 applied to the data structure, the data structure identifier 1104, a cache hit rate 703, a total duration of memory access, and an access count 1105. In other embodiments, additional or other information may be displayed in the analysis 1106. The analysis 1106 may, for example, be displayed alongside the marker 701 in the hailstone plot 700 or may appear through an interaction with the marker 701.

Embodiments of the present disclosure may be implemented using electronics hardware, software, or a combination thereof. In some embodiments, the invention may be implemented by one or multiple computer processors executing program instructions stored in memory. In some embodiments, the invention may be implemented partially or fully in hardware, for example using one or more field programmable gate arrays (FPGAs) or application specific integrated circuits (ASICs) to rapidly perform processing operations.

Figure 12:
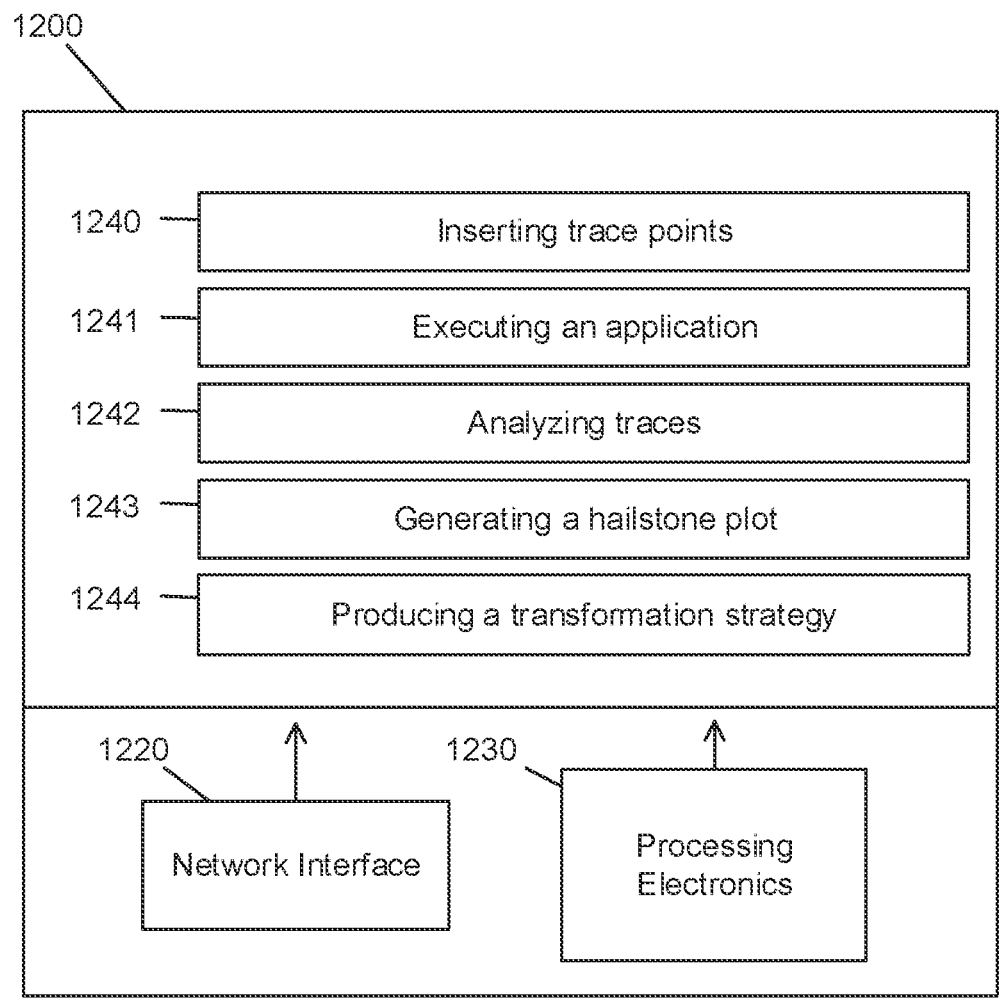
FIG. 12 shows an apparatus for tracking data accesses and producing transformation strategies, in accordance with embodiments of the present disclosure.

FIG. 12 shows an apparatus 1200 for tracking data accesses and producing transformation strategies for a computer program, according to embodiments of the present disclosure. The apparatus may include a network interface 1220 and processing electronics 1230. The processing electronics 1230 may include a computer processor executing program instructions stored in memory, or other electronics components such as digital circuitry, including for example FPGAs and ASICs. The network interface 1220 may include an optical communication interface or radio communication interface, such as a transmitter and receiver. The apparatus may include several functional components, each of which may be partially or fully implemented using the underlying network interface 1220 and processing electronics 1230. Examples of functional components may include modules for inserting 1240 trace points, executing 1241 an application, analyzing 1242 traces, generating 1243 a hailstone plot, and producing 1244 a transformation strategy.

Figure 13:
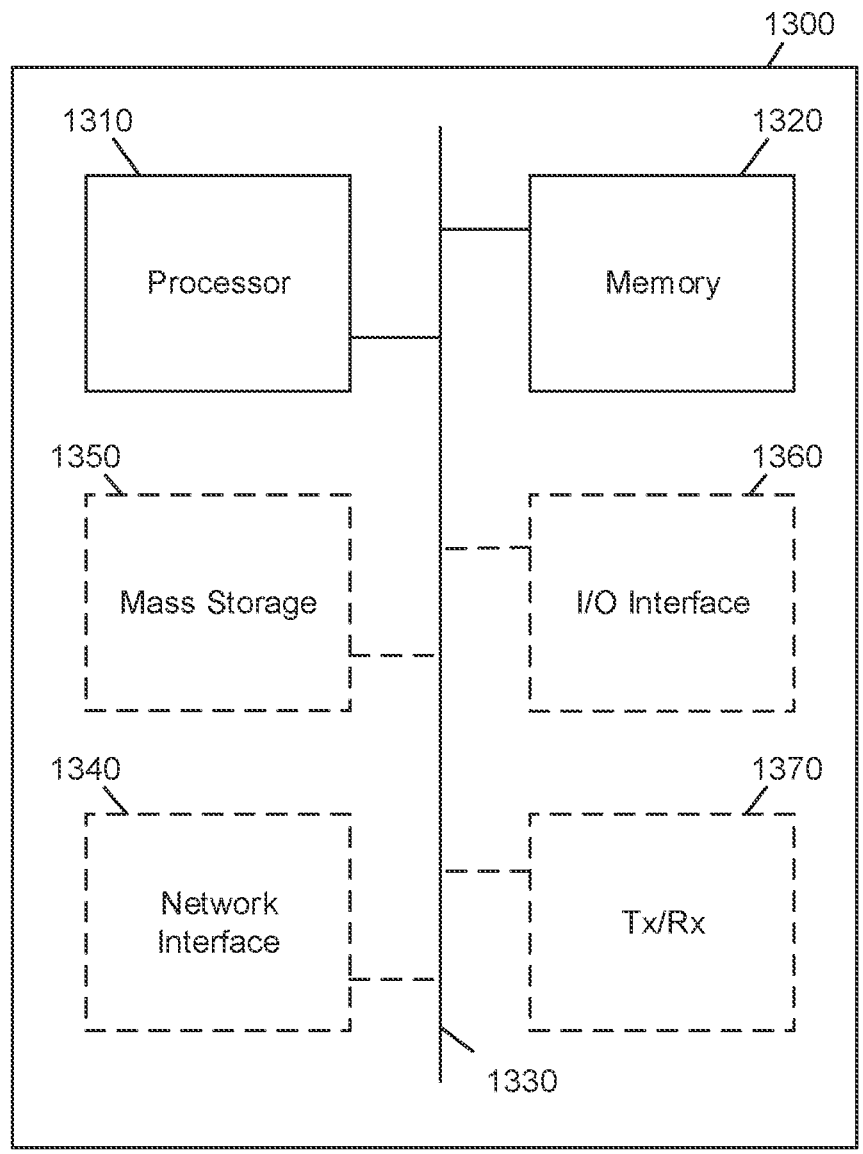
FIG. 13 shows a schematic of an embodiment of an electronic device that may implement at least part of the methods and features of the present disclosure.

FIG. 13 shows a schematic diagram of an electronic device 1300 that may perform any or all of the operations of the above methods and features explicitly or implicitly described herein, according to different embodiments of the present disclosure. For example, a computer system 100 may be configured as electronic device 1300. The electronic device 1300 may be used to implement the apparatus 1200 of FIG. 12, for example. The electronic device 1300 may further be configured to execute an application 200, as described in relation to FIG. 2.

As shown, the electronic device 1300 may include a processor 1310, such as a Central Processing Unit (CPU) or specialized processors such as a Graphics Processing Unit (GPU) or other such processor unit, memory 1320, and a bi-directional bus 1330 to communicatively couple the components of electronic device 1300. Electronic device 1300 may also optionally include a network interface 1340, non-transitory mass storage 1350, an I/O interface 1360, and a transceiver 1370. According to certain embodiments, any or all of the depicted elements may be utilized, or only a subset of the elements. Further, the electronic device 1300 may contain multiple instances of certain elements, such as multiple processors, memories, or transceivers. Also, elements of the hardware device may be directly coupled to other elements without the bi-directional bus 1340. Additionally or alternatively to a processor and memory, other electronics, such as integrated circuits, may be employed for performing the required logical operations.

The memory 1320 may include any type of tangible, non-transitory memory such as static random access memory (SRAM), dynamic random access memory (DRAM), synchronous DRAM (SDRAM), read-only memory (ROM), any combination of such, or the like. The mass storage element 1350 may include any type of tangible, non-transitory storage device, such as a solid state drive, hard disk drive, a magnetic disk drive, an optical disk drive, USB drive, or any computer program product configured to store data and machine executable program code. According to certain embodiments, the memory 1320 or mass storage 1350 may have recorded thereon statements and instructions executable by the processor 1310 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product may include a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

Although a combination of features is shown in the illustrated embodiments, not all of them need to be combined to realize the benefits of various embodiments of this disclosure. In other words, a system or method designed according to an embodiment of this disclosure will not necessarily include all features shown in any one of the Figures or all portions schematically shown in the Figures. Moreover, selected features of one example embodiment may be combined with selected features of other example embodiments.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method implemented by a computing device including a processor coupled to a non-transitory processor-readable memory, comprising:
   receiving a computer program having a plurality of data structures having associated thereto one or more accessor functions each configured to interact with a respective data structure of the plurality of data structures, wherein the computer program further has a plurality of components calling the one or more accessor functions when the computer program is executed;
   inserting, at each of a set of the one or more accessor functions, a respective trace point, wherein each trace point is configured to, when the respective accessor function of the one or more accessor functions is called, report an access of the respective data structure of the plurality of data structures associated with the respective accessor function of the one or more accessor functions;
   executing the computer program to call the one or more accessor functions;
   recording, for each access of the respective data structure of the plurality of data structures reported by each trace point, a respective trace including a plurality of access metrics;
   analyzing, for each data structure of the plurality of data structures, the plurality of access metrics of traces corresponding to the respective data structure of the plurality of data structures to obtain a respective rank indicating a priority for refactoring the respective data structure of the plurality of data structures; and
   displaying, for each data structure of the plurality of data structures, the respective rank of the respective data structure of the plurality of data structures.

2. The method of claim 1 further comprising:
   selecting one or more data structures of the plurality of data structures for refactoring in accordance with the respective rank of the respective data structure of the plurality of data structures to obtain one or more candidate data structures; and
   refactoring the one or more candidate data structures.

3. The method of claim 2 further comprising:
   compiling one or more of the plurality of components in accordance with the refactored one or more candidate data structures; and
   executing the computer program in accordance with the compiled one or more of the plurality of components.

4. The method of claim 1 wherein the plurality of access metrics of each trace identifies the respective accessor function of the one or more accessor functions called and includes at least one of a measured latency and a return memory address.

5. The method of claim 1 wherein analyzing, for each data structure of the plurality of data structures, the plurality of access metrics of the traces corresponding to the respective data structure of the plurality of data structures to obtain the respective rank indicating the priority for refactoring the respective data structure of the plurality of data structures includes:
   simulating, for each data structure of the plurality of data structures, a respective cache hit rate.

6. The method of claim 1 wherein analyzing, for each data structure of the plurality of data structures, the plurality of access metrics of the traces corresponding to the respective data structure of the plurality of data structures to obtain the respective rank indicating the priority for refactoring the respective data structure of the plurality of data structures includes:
   determining aggregate statistics depending from the plurality of access metrics of each trace.

7. The method of claim 1 further comprising:
   determining, in accordance with the plurality of access metrics of each trace, one or more patterns of data movement.

8. The method of claim 1 wherein displaying, for each data structure of the plurality of data structures, the respective rank of the respective data structure of the plurality of data structures includes:
   generating one or more hailstone plots each depicting a set of data structures from the plurality of data structures as a corresponding set of markers indicating the respective rank of the respective data structure of the plurality of data structures.

9. The method of claim 8 wherein each marker of the corresponding set of markers of each hailstone plot further indicates, for the respective data structure of the plurality of data structures, a respective cache hit rate, a respective count of accesses of the respective data structure of the plurality of data structures, and a respective duration of the accesses of the respective data structure of the plurality of data structures.

10. The method of claim 9 wherein each marker of the corresponding set of markers of each hailstone plot has associated thereto a respective size, a respective position, and a respective color; and indicates the respective cache hit rate, the respective count of the accesses of the respective data structure of the plurality of data structures, and the respective duration of the accesses of the respective data structure of the plurality of data structures through the respective size, the respective position, and the respective color.

11. The method of claim 8 wherein each set of data structures from the plurality of data structures corresponds to one of a plurality of types of data structures.

12. The method of claim 11 wherein the plurality of types of data structures includes a map type, a vector type, and a queue type.

13. The method of claim 1 wherein:
each access of each data structure of the plurality of data structures has associated thereto a respective duration of data access and a respective memory bandwidth consumption;
all durations of data access associated with accesses of each data structure of the plurality of data structures define a respective total duration of data access for the respective data structure of the plurality of data structures;
all memory bandwidth consumptions associated with the accesses of each data structure of the plurality of data structures define a respective total memory bandwidth consumption for the respective data structure of the plurality of data structures; and
the respective rank of each data structure of the plurality of data structures depends from a weighted sum of the respective total duration of data access for the respective data structure of the plurality of data structures and the respective total memory bandwidth consumption for the respective data structure of the plurality of data structures.

14. The method of claim 1 wherein at least one data structure of the plurality of data structures is a container having a plurality of data elements.

15. The method of claim 1 further comprising:
determining, in accordance with the respective rank of each data structure of the plurality of data structures, one or more transformation strategies each identifying one or more groups of data structures from the plurality of data structures, wherein each transformation strategy further identifies, for each of the one or more groups of data structures from the plurality of data structures, respective one or more refactoring transformations;
selecting a target transformation strategy from the one or more transformation strategies;
refactoring the one or more groups of data structures from the plurality of data structures of the target transformation strategy in accordance with the respective one or more refactoring transformations;
compiling one or more of the plurality of components in accordance with the refactored one or more groups of data structures from the plurality of data structures; and
executing the computer program in accordance with the compiled one or more of the plurality of components.

16. The method of claim 15 wherein each of the respective one or more refactoring transformations of each transformation strategy is a respective cache replacement algorithm.

17. The method of claim 16 wherein the respective cache replacement algorithm is one of:
a first-in-first-out algorithm;
a last-in-first-out algorithm;
a least-recently-used algorithm;
a least-frequently-used algorithm;
a least-frequently-recently-used algorithm; and
a clock algorithm.

18. The method of claim 1 wherein each data structure of the plurality of data structures belongs to a data structure library.

19. A computing device comprising a processor coupled to a non-transitory processor-readable memory, the non-transitory processor-readable memory having stored thereon instructions to be executed by the processor to implement the method of claim 1.

20. A non-transitory processor-readable memory having stored thereon instructions to be executed by a processor to implement the method of claim 1.

* * * * *